(12) United States Patent
Sakurai et al.

(10) Patent No.: US 12,427,749 B2
(45) Date of Patent: Sep. 30, 2025

(54) GLASS PLATE STRUCTURE, DIAPHRAGM, AND OPENING MEMBER

(71) Applicant: AGC Inc., Tokyo (JP)

(72) Inventors: Kento Sakurai, Tokyo (JP); Jun Akiyama, Tokyo (JP)

(73) Assignee: AGC INC., Tokyo (JP)

( * ) Notice: Subject to any disclaimer, the term of this patent is extended or adjusted under 35 U.S.C. 154(b) by 362 days.

(21) Appl. No.: 18/108,540

(22) Filed: Feb. 10, 2023

(65) Prior Publication Data

US 2023/0191745 A1 Jun. 22, 2023

Related U.S. Application Data

(63) Continuation of application No. PCT/JP2021/030678, filed on Aug. 20, 2021.

(30) Foreign Application Priority Data

Aug. 26, 2020 (JP) .................................. 2020-142842

(51) Int. Cl.
*B32B 15/04* (2006.01)
*B32B 3/28* (2006.01)
(Continued)

(52) U.S. Cl.
CPC ................ *B32B 7/022* (2019.01); *B32B 3/28* (2013.01); *B32B 7/12* (2013.01); *B32B 17/00* (2013.01); *H04R 7/10* (2013.01); *B32B 2250/02* (2013.01); *B32B 2250/40* (2013.01); *B32B 2255/26* (2013.01); *B32B 2307/10* (2013.01); *B32B 2307/54* (2013.01); *B32B 2307/542* (2013.01); *B32B 2307/72* (2013.01); *B32B 2307/732* (2013.01); *B32B 2315/08* (2013.01); *B32B 2383/00* (2013.01); *H04R 2307/023* (2013.01)

(58) Field of Classification Search
CPC ....................................................... B32B 7/12
USPC .................................................. 428/426, 428
See application file for complete search history.

(56) References Cited

U.S. PATENT DOCUMENTS 10,809,424 B2 * 10/2020 Kawai .................... G10K 13/00
2013/0312908 A1 * 11/2013 Mader ............... B32B 17/10908
156/285

(Continued)

OTHER PUBLICATIONS

Mal et al., "A Novel Glass Laminated Structure for Flat Panel Loudspeakers," Audio Engineering Society, Convention Paper, presented at the 124th Convention, May 17-20, 2008, 6 pages.

(Continued)

*Primary Examiner* — Lauren R Colgan
(74) *Attorney, Agent, or Firm* — Foley & Lardner LLP

(57) ABSTRACT

A glass sheet composite includes: two or more sheets; and an intermediate layer between at least a pair of the sheets. At least one of the pair of sheets is a glass sheet. The intermediate layer satisfies all of the following properties: (1) the intermediate layer has a thickness of 20 μm or less, (2) a compressive shear storage modulus at a temperature of 25° C. is $1.0 \times 10^4$ Pa or less, and (3) at the temperature of 25° C. and 1 Hz, the compressive shear storage modulus is higher than a compressive shear loss modulus. The glass sheet composite has a loss coefficient at 25° C. of 0.01 or more, and a sheet-thickness-direction longitudinal wave acoustic velocity of $4.0 \times 10^3$ m/s or more.

18 Claims, 5 Drawing Sheets

(51) Int. Cl.
    *B32B 7/022*     (2019.01)
    *B32B 7/12*     (2006.01)
    *B32B 17/00*     (2006.01)
    *B32B 17/06*     (2006.01)
    *H04R 7/10*     (2006.01)

(56) References Cited

U.S. PATENT DOCUMENTS

| | | | |
|---|---|---|---|
| 2018/0284328 A1* | 10/2018 | Kawai | B32B 17/06 |
| 2019/0030862 A1* | 1/2019 | Akiyama | H04R 7/06 |
| 2020/0404412 A1* | 12/2020 | Akiyama | H04R 7/10 |

OTHER PUBLICATIONS

International Searching Authority, "International Search Report," issued in connection with International Patent Application No. PCT/JP2021/030678, dated Nov. 2, 2021.

International Searching Authority, "Written Opinion," issued in connection with International Patent Application No. PCT/JP2021/030678, dated Nov. 2, 2021.

* cited by examiner

GLASS PLATE STRUCTURE, DIAPHRAGM, AND OPENING MEMBER

CROSS-REFERENCE TO RELATED APPLICATIONS

This is a bypass continuation of International Patent Application No. PCT/JP2021/030678, filed on Aug. 20, 2021, which claims priority to Japanese Patent Application No. 2020-142842, filed on Aug. 26, 2020. The contents of these applications are hereby incorporated by reference in their entireties.

TECHNICAL FIELD

The present invention relates to a glass sheet composite having good acoustic performance, and also relates to a diaphragm and an opening member using the glass sheet composite.

BACKGROUND ART

A cone paper or resin has been generally used as a diaphragm for loudspeakers or microphones. Such a material has a high loss coefficient, a resonant vibration hardly occurs therein, and thus, is thought to have good sound reproduction performance in the audible range.

However, since the acoustic velocity is low in any of these materials, when a high frequency causes the material excitation, a vibration of the material is less likely to follow, and a divided vibration readily occurs. It is therefore difficult to output a desired sound pressure particularly in a high-frequency region. As described above, these materials are not suitable for use as diaphragms having large area.

In recent years, a range required to be reproduced for a high-resolution sound source and the like is a high-frequency region of 20 kHz or more, which is a range poorly audible by a human ear, but it is said that the range provides a stronger emotional impact to a listener, for example, it makes the listener feel a strong realistic sensation. Therefore, it is preferred that a sound wave vibration in the range can be reproduced with high fidelity.

Accordingly, it is conceived that a material having a high velocity of sound propagation therethrough, such as a metal, a ceramic, or glass, is used in place of the cone paper or resin. However, since these materials generally have the loss coefficient as small as about $1/10$ to $1/100$ of that of paper, an unintended reverberant sound tends to remain. Furthermore, significant deterioration of a tone color may occur due to an occurrence of a resonant mode when the material is excited at a natural frequency thereof.

Here, as the diaphragm for the loudspeakers, laminated glass containing a polyvinyl butyral polymer between two glass sheets is known (Non Patent Literature 1).

CITATION LIST

Non Patent Literature

Non Patent Literature 1: Olivier Mal et. al., "A Novel Glass Laminated Structure for Flat Panel Loudspeakers", AES Convention 124, 7343.

SUMMARY OF INVENTION

Technical Problem

The diaphragm described in Non Patent Literature 1 is intended to attenuate a vibration of the glass, particularly a resonant vibration, due to an attenuation characteristic of a layer (intermediate layer) between two glass sheets, thereby achieving smooth sound reproduction.

However, although there is usually one peak at which the attenuation characteristic of the intermediate layer is maximized, since there are a plurality of resonance points of the glass, not all the resonant vibrations can be attenuated, or frequencies other than a resonant frequency are also attenuated. In the case of the laminated glass using the polyvinyl butyral polymer described in Non Patent Literature 1, since a loss coefficient of the polyvinyl butyral polymer varies depending on a frequency, a region in which attenuation is large and a region in which the attenuation is small may be present in an audible frequency range. As described above, there is a problem that it is difficult to achieve smooth sound reproduction in a wide frequency band.

When the glass sheet is thick and has a large mass, a required vibration damping force increases, and thus it is necessary to improve vibration damping capacity of the intermediate layer material or to increase a film thickness to improve the vibration damping capacity. However, there is a limit in improving the vibration damping capacity while maintaining a solid state, and there is a problem that a longitudinal wave acoustic velocity decreases when the film thickness is increased.

Therefore, in order to solve the above problems, an object of the present invention is to provide a glass sheet composite having good acoustic performance.

Solution to Problem

As a result of intensive studies, the present inventors have found that a smooth frequency response characteristic can be obtained by providing a predetermined intermediate layer between a predetermined pair of sheets in a glass sheet composite, and have completed the present invention. That is, the present invention is as follows.

[1] A glass sheet composite including: two or more sheets; and an intermediate layer between at least a pair of the sheets, in which at least one of the pair of sheets is a glass sheet, the intermediate layer satisfies all of the following properties (1) to (3), and the glass sheet composite has a loss coefficient at 25° C. of 0.01 or more, and a sheet-thickness-direction longitudinal wave acoustic velocity of $4.0 \times 10^3$ m/s or more, (1) the intermediate layer has a thickness of 20 μm or less, (2) a compressive shear storage modulus at a temperature of 25° C. is $1.0 \times 10^4$ Pa or less, and (3) at the temperature of 25° C. and 1 Hz, the compressive shear storage modulus is higher than a compressive shear loss modulus.

[2] The glass sheet composite according to [1], in which all of the pair of sheets are glass sheets, and the glass sheet composite has the loss coefficient at 25° C. of 0.01 or more, and the sheet-thickness-direction longitudinal wave acoustic velocity of $5.0 \times 10^3$ m/s or more.

[3] The glass sheet composite according to [1] or [2], in which a total thickness of the pair of sheets is 1.0 mm or more, and the intermediate layer and the sheets satisfy the following Formula A.

[Math. 1]

$$0 < (\text{thickness of intermediate layer [mm]}/\text{total thickness of pair of sheets [mm]}) \times (\text{compressive shear storage modulus of intermediate layer material [Pa]}/\text{mean Young's modulus of pair of sheets [Pa]}) \leq 1.0 \times 10^{-10} \quad (A)$$

[4] The glass sheet composite according to any one of [1] to [3], in which the pair of sheets have a mean Young's modulus of 20 GPa or more at 25° C.

[5] The glass sheet composite according to any one of [1] to [4], in which a product of a total thickness of the pair of sheets and a mean Young's modulus of the pair of sheets is $2.0 \times 10^7$ Pa·m or more.

[6] The glass sheet composite according to any one of [1] to [5], in which a value obtained by dividing the thickness of the intermediate layer by a total thickness of the pair of sheets is 0.02 or less.

[7] The glass sheet composite according to any one of [1] to [6], in which a value obtained by dividing the compressive shear storage modulus of an intermediate layer material by a mean Young's modulus of the pair of sheets is $1 \times 10^4$ or less.

[8] The glass sheet composite according to any one of [1] to [7], in which a value obtained by dividing a mass of one sheet A of the pair of sheets by a mass of the other sheet B of the pair of sheets is 0.8 to 1.25.

[9] The glass sheet composite according to any one of [1] to [8], in which at least one of the pair of sheets has a loss coefficient at 25° C. of $1 \times 10^{-4}$ or more.

[10] The glass sheet composite according to any one of [1] to [9], in which at least one of the pair of sheets has a sheet-thickness-direction longitudinal wave acoustic velocity of $4.0 \times 10^3$ m/s or more.

[11] The glass sheet composite according to any one of [1] to [10], including a sliding layer provided on a surface of the pair of sheets that is in contact with the intermediate layer.

[12] The glass sheet composite according to any one of [1] to [11], in which the glass sheet has a specific gravity of 2.8 or less.

[13] The glass sheet composite according to any one of [1] to [12], in which the glass sheet has a specific elastic modulus of $2.5 \times 10^7$ m²/s² or more.

[14] The glass sheet composite according to any one of [1] to [13], in which a difference between a refractive index of the intermediate layer and a refractive index of the pair of sheets in contact with the intermediate layer is 0.3 or less.

[15] The glass sheet composite according to any one of [1] to [14], which has a curved surface shape.

[16] A diaphragm including: the glass sheet composite according to any one of [1] to [15]; and at least one vibrator disposed on one surface or both surfaces of the glass sheet composite.

[17] An opening member using the glass sheet composite according to any one of [1] to [15] or the diaphragm according to [16].

Advantageous Effects of Invention

According to the present invention, a glass sheet composite including a predetermined intermediate layer between a predetermined pair of sheets can effectively reduce peaks and dips due to a resonant vibration, and can obtain a smooth frequency response characteristic as the glass sheet composite.

Therefore, according to the present invention, in the case where a vibrator is attached and used as a diaphragm for a loudspeaker or used for active noise control or echo reduction, since the structure prevents the resonant vibration of a member, smooth sound reproduction or sound control can be achieved. Furthermore, high vibration damping capacity can prevent generation of abnormal noise caused by the resonant vibration and also reduce transmission noise from a noise source.

BRIEF DESCRIPTION OF DRAWINGS

FIG. 4A is a plan view of the glass sheet composite, and FIG. 4B is a cross-sectional view taken along a line A-A' in FIG. 4A.

FIG. 5A is a plan view of the glass sheet composite, and FIG. 5B is a cross-sectional view taken along a line A-A' in FIG. 5A.

FIG. 6A is a plan view of the glass sheet composite, FIG. 6B is a cross-sectional view taken along a line I-I in FIG. 6A, and FIG. 6C is an enlarged view of a portion C in FIG. 6B.

FIG. 7A is a plan view of the glass sheet composite, and FIG. 7B is a cross-sectional view taken along a line I-I in FIG. 7A.

DESCRIPTION OF EMBODIMENTS

Figure 1:
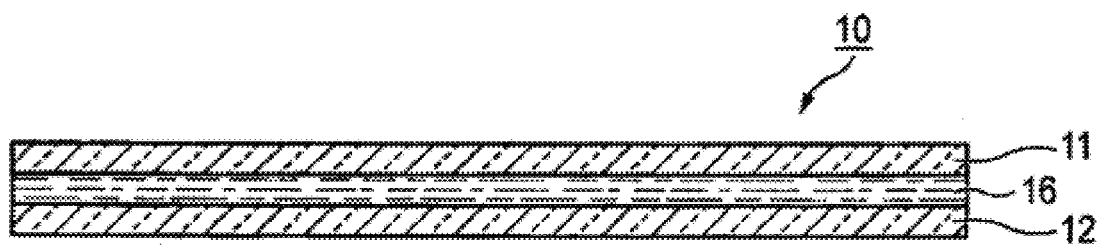
FIG. 1 is a cross-sectional view of a glass sheet composite according to a first embodiment of the present invention.

Details and other features of the present invention will be described below based on embodiments of the present invention.

In the following drawings, the same or corresponding reference numeral is assigned to the same or corresponding members or parts, and duplicated description is thereby omitted. In addition, unless otherwise specified, the drawings are not intended to show a relative ratio among members or parts. Accordingly, specific dimensions may be properly selected in the context of the following non-limiting embodiments.

Furthermore, "-" indicating a numerical range in the present description is used in the sense of including the numerical values set forth before and after the "-" as a lower limit value and an upper limit value.

<Glass Sheet Composite>

A glass sheet composite of the present invention is a glass sheet composite including at least two sheets and an intermediate layer disposed between the two sheets, at least one of the two sheets is a glass sheet, and the intermediate layer contains a material satisfying specific properties.

With such a configuration of the glass sheet composite according to the present invention, when one sheet resonates, the other sheet does not resonate due to the presence of the intermediate layer, or oscillation of the other sheet due to resonance can be attenuated, and thus it is possible to obtain a smooth frequency response characteristic as compared with a case of using a single glass sheet.

When the glass sheet composite of the present invention is used as a glass diaphragm, the higher the acoustic velocity, the higher the reproducibility of sound in a high frequency region, and thus, the glass sheet composite of the present invention is preferable for use as a diaphragm. Specifically, a sheet-thickness-direction longitudinal wave acoustic velocity at 25° C. is $4.0 \times 10^3$ m/s or more, preferably $4.5 \times 10^3$ m/s or more, more preferably $5.0 \times 10^3$ m/s or more, and still more preferably $5.5 \times 10^3$ m/s or more, and an upper limit is not particularly limited.

The longitudinal wave acoustic velocity refers to a velocity at which a longitudinal wave propagates in the diaphragm. The longitudinal wave acoustic velocity and the Young's modulus can be measured by an ultrasonic pulse method described in Japanese Industrial Standards (JIS-R1602-1995).

When the glass sheet composite of the present invention is used as the glass diaphragm, the larger the loss coefficient, the larger the vibration damping of the sheet composite, which is preferable for use as a diaphragm. Specifically, the loss coefficient at 25° C. is 0.01 or more, preferably 0.05 or more, more preferably 0.1 or more, still more preferably 0.2 or more, even more preferably 0.3 or more, and most preferably 0.4 or more, and an upper limit is not particularly limited.

As for the loss coefficient, a value calculated by a half-width method is used. Denoting f as a resonant frequency of a material and W as a frequency width at a point decreased by −3 dB from a peak value of an amplitude h (that is, a point of maximum amplitude −3 [dB]), a value represented by {W/f} is defined as the loss coefficient. In order to prevent the resonance, the loss coefficient may be increased, namely, this means that the frequency width W becomes relatively large with respect to the amplitude h and the peak becomes broader.

(Intermediate Layer)

Among the materials constituting the intermediate layer, a preferable material is a material satisfying all of the following properties (1) to (3).

(1) the intermediate layer has a thickness of 20 μm or less,
(2) a compressive shear storage modulus at a temperature of 25° C. is $1.0 \times 10^4$ Pa or less, and
(3) at the temperature of 25° C. and 1 Hz, the compressive shear storage modulus is higher than a compressive shear loss modulus.

In the case of a laminated glass using a dynamic viscoelasticity mechanism of an intermediate layer material in related art, since the loss coefficient as the glass sheet composite is improved by a contribution of the dynamic viscoelasticity of the intermediate layer material, as a sheet thickness increases, it is necessary to increase a thickness of the intermediate layer in order to obtain a high loss coefficient.

In the present invention, it has been found that the loss coefficient is improved while fluidity of the intermediate layer is prevented by satisfying the properties (1), (2), and (3). In general, in the case of increasing the loss coefficient of the glass sheet composite by increasing the thickness of the intermediate layer, there is a trade-off relationship in which the acoustic velocity of the glass sheet composite decreases as the thickness of the intermediate layer increases. On the other hand, in the present configuration, when the material of the intermediate layer satisfies the property (2), in addition to a higher loss coefficient in the glass sheet composite, a high acoustic velocity can be ensured in the case where the intermediate layer is thin.

Regarding the property (1), the thickness of the intermediate layer is 20 μm or less, preferably 10 μm or less, more preferably 8 μm or less, and still more preferably 5 μm or less, from the viewpoint of obtaining a high loss coefficient of the glass sheet composite. From the viewpoint of surface roughness of the sheet, the thickness is preferably 0.1 μm or more.

The thickness of the intermediate layer is preferably equal to or greater than surface roughness of a sheet in a surface unpolished state in order to prevent the sheets from coming into contact with each other. When the two sheets are different in surface roughness from each other, it is preferable that the thickness is equal to or greater than the surface roughness of the sheet having larger roughness. Since surface roughness of a sheet subjected to surface polishing is very small, the thickness may be at least equal to or greater than the surface roughness.

Regarding the property (2), the material of the intermediate layer has the compressive shear storage modulus of $1.0 \times 10^4$ Pa or less, preferably $7.0 \times 10^3$ Pa or less, and more preferably $5.0 \times 10^3$ Pa or less at the temperature of 25° C. When the material satisfies the property (2), a higher loss coefficient is obtained in the glass sheet composite as a film thickness of the intermediate layer becomes thinner. From the viewpoint of the fluidity, the compressive shear storage modulus is preferably $1.0 \times 10^2$ Pa or more.

The property (3) means that the fluidity of the intermediate layer material is low, that is, the intermediate layer material is not liquid. Since the fluidity of the intermediate layer is prevented by satisfying the property (3), any cutting of the glass sheet composite is easily performed. The intermediate layer material is preferably a gel material.

The intermediate layer and the sheets preferably satisfy the following Formula A.

[Math. 2]

$$0 < (\text{thickness of intermediate layer [mm]/total thickness of pair of sheets [mm]}) \times (\text{compressive shear storage modulus of intermediate layer material [Pa]/mean Young's modulus of pair of sheets [Pa]}) \leq 1.0 \times 10^{-10} \quad (A)$$

A right side of Formula A is $1.0 \times 10^{-10}$ or less, preferably $7.5 \times 10^{-11}$ or less, more preferably $5.0 \times 10^{-11}$ or less, still more preferably $1.0 \times 10^{-12}$ or less, and even more preferably $5.0 \times 10^{-13}$ or less.

Formula A means that the thickness and the elastic modulus (Young's modulus) of the intermediate layer and the sheets satisfy a specific relationship.

In Formula A, it is preferable that both "thickness of intermediate layer/total thickness of the pair of sheets" and "compressive shear storage modulus of intermediate layer material/mean Young's modulus of the two sheets" are small.

Regarding the thickness of the intermediate layer and the total thickness of the pair of sheets, when the glass sheet composite of the present invention is used as an opening member such as a window, the thickness of the intermediate layer is preferably small from the viewpoint of increasing the loss coefficient of the glass sheet composite, and the thickness of the sheet is preferably large from the viewpoint of safety. As shown in the property (1) above, the smaller the thickness of the intermediate layer, the more preferable. Regarding the thickness of the sheet, specifically, the total thickness of the pair of sheets is preferably 1.0 mm or more, more preferably more than 1.0 mm.

Regarding the compressive shear storage modulus of the intermediate layer material and the mean Young's modulus of the pair of sheets, from the viewpoint of applicability to a member requiring a large area such as an opening member, when the Young's modulus of the sheet is high in addition to the sheet thickness, warpage is reduced, which is preferable.

Here, the mean Young's modulus of the pair of sheets at 25° C. is preferably at least 20 GPa or more, more preferably 60 GPa or more, and still more preferably 70 GPa or more.

Further, it is necessary that both preferable ranges of the thickness of the pair of sheets and the mean Young's modulus of the pair of sheets are satisfied, and "total thickness of the pair of sheets×mean Young's modulus of the pair of sheets" is preferably increased. Specifically, the product is preferably $2.0 \times 10^7$ Pa·m or more, more preferably $6.0 \times 10^7$ Pa·m or more, and still more preferably $1.0 \times 10^8$ Pa·m or more.

Further, as shown in the property (2), since the compressive shear storage modulus of the intermediate layer material is $1.0 \times 10^4$ Pa or less, when the thickness of the intermediate layer becomes large, the Young's modulus of the glass sheet composite is greatly lowered, which is not preferable. On the other hand, when the thickness of the intermediate layer is sufficiently small with respect to the total thickness of the pair of sheets, an influence of the intermediate layer material on the Young's modulus of the glass sheet composite is reduced, which is preferable. Specifically, "thickness of intermediate layer/total thickness of the pair of sheets" is preferably 0.02 or less, more preferably 0.01 or less, and still more preferably 0.005 or less.

When an elastic component of the intermediate layer increases, that is, the compressive shear storage modulus increases, even if the intermediate layer is thinned, elasticity of the intermediate layer material with respect to a vibration of the glass cannot be ignored with respect to the Young's modulus of the sheet, and the loss coefficient cannot be improved. Specifically, "compressive shear storage modulus of the intermediate layer material/mean Young's modulus of the two glass" is preferably $1 \times 10^4$ or less, more preferably $5.0 \times 10^3$ or less, and still more preferably $1 \times 10^3$ or less so that a contribution of the elastic component in the dynamic viscoelasticity of the intermediate layer material is reduced.

Examples of the material constituting the intermediate layer include a carbon-based, fluorine-based, or silicone-based polymeric material on the premise that the above properties (1) to (3) are satisfied. Specific examples thereof include ABS, AES, AS, CA, CN, CPE, EEA, EVA, EVOH, TO, PMMA, PMP, PP, PS, PVC, RB, TPA, TPE, TPEE, TPF, TPO, TPS, TPU, TPVC, AAS, ACS, PET, PPE, PA6, PA66, PBN, PBT, PC, POM, PPO, ETFE, FEP, LCP, PEEK, PEI, PES, PFA, PPS, PSV, PTFE, PVDF, silicone, polyurethane, PI, and PF. Alternatively, examples thereof include a composite material obtained by combining the above materials. These materials may be used alone or in combination of two or more thereof.

A proportion of the material satisfying the specific properties in the intermediate layer is preferably 10 mass % to 100 mass %, more preferably 30 mass % to 100 mass %, still more preferably 50 mass % to 100 mass %, and even more preferably 70 mass % to 100 mass %.

The intermediate layer may contain an optional component in addition to the materials satisfying the specific properties as long as effects of the present invention are not impaired.

Examples of the optional component include a colorant, a fluorescent agent, an ultraviolet absorber, an infrared absorber, a magnetic material, and a stress relaxation agent. A filler or particles may be combined with the material constituting the intermediate layer to impart functions such as coloring, fluorescence, ultraviolet absorption, infrared absorption, magnetic force, stress relaxation, and the like.

(Sheet and Glass Sheet)

It is preferable that, one of the two sheets and the other sheet have different peak top values of resonant frequency. It is more preferable that ranges of the resonant frequency of the two sheets do not overlap with each other. However, even though the ranges of the resonant frequency of the one sheet and that of the other sheet overlap with each other or the two sheets have the same peak top value, the presence of the intermediate layer prevents the resonance of the one sheet from causing synchronous vibration to the other sheet and thereby reduces the resonance to some degree. Therefore, a high loss coefficient can be obtained as compared with the case of a single glass sheet.

That is, denoting Qa and wa respectively as the resonant frequency (peak top) and the half-width of resonance amplitude of the one sheet and denoting Qb and wb respectively as the resonant frequency (peak top) and the half-width of resonance amplitude of the other sheet, it is preferable that a relationship represented by the following Formula 1 is satisfied.

$$(wa+wb)/4 < |Qa-Qb| \qquad \text{Formula 1}$$

The larger the value of a left side of the Formula 1, the larger the difference (|Qa−Qb|) in resonant frequency between the two sheets and the higher the loss coefficient, which is preferable.

Therefore, it is more preferable that the following Formula 1' is satisfied, and it is still more preferable that the following Formula 1" is satisfied.

$$(wa+wb)/2 < |Qa-Qb| \qquad \text{Formula 1'}$$

$$(wa+wb)/1 < |Qa-Qb| \qquad \text{Formula 1"}$$

The resonant frequency (peak top) and the half-width of the resonance amplitude of the sheet can be determined by the same method as the loss coefficient of the glass sheet composite.

It is preferred that a mass difference between the one sheet and the other sheet is smaller, and it is more preferred that there is no mass difference between two sheets. In the case where the sheets have different mass, the resonance of the lighter sheet can be reduced by the heavier sheet but it is difficult to reduce the resonance of the heavier sheet by the lighter sheet. That is, if a mass ratio is imbalanced, resonant vibrations cannot theoretically be mutually eliminated because of the difference in inertial force.

The mass ratio of the two sheets represented by (mass of one sheet A/mass of the other sheet B) is preferably 0.8 to 1.25, more preferably 0.9 to 1.11, and still more preferably 1.0.

From the viewpoint of the safety, the total thickness of the two sheets is preferably 1.0 mm or more, more preferably more than 1.0 mm, still more preferably 1.5 mm or more, yet still more preferably 2 mm or more, and even more preferably 3 mm or more.

The glass sheet composite in which the total thickness of the two sheets is in the above range is suitable for use in the opening member for buildings or vehicles in which generation of abnormal noise caused by a resonance phenomenon is prevented.

It is preferable, for use in the diaphragm applications, that at least one of the one sheet and the other sheet has a high loss coefficient, because this enables the composite to show enhanced vibration damping. Specifically, the loss coefficient at 25° C. of the sheet is preferably $1 \times 10^{-4}$ or more, more preferably $3 \times 10^{-4}$ or more, still more preferably $5 \times 10^{-4}$ or more. There is no particular upper limit, but the loss coefficient of the sheet is preferably $5 \times 10^{-3}$ or less from the viewpoints of productivity and manufacturing cost. It is more preferable that both the one sheet and the other sheet have the above loss coefficient.

The loss coefficient of the sheet can be determined by the same method as the loss coefficient of the glass sheet composite.

It is preferable, for use in the diaphragm applications, that at least one of the one sheet and the other sheet has a high sheet-thickness-direction longitudinal wave acoustic velocity, because the sound reproducibility in the high frequency region is enhanced. Specifically, the longitudinal wave acoustic velocity of the sheet is preferably $4.0 \times 10^3$ m/s or more, more preferably $4.5 \times 10^3$ m/s or more, and still more preferably $5.0 \times 10^3$ m/s or more. There is no particular upper limit, but the longitudinal wave acoustic velocity of the sheet is preferably $7.0 \times 10^3$ m/s or less from the viewpoints of sheet productivity or raw material cost. It is more preferable that both the one sheet and the other sheet satisfy the above acoustic velocity.

The acoustic velocity of the sheet can be measured by the same method as the longitudinal wave acoustic velocity of the glass sheet composite.

A sliding layer may be provided on a surface of the pair of sheets that is in contact with the intermediate layer. The sliding layer is a generic term for layers having a sliding property obtained by, for example, a water repellent, oil repellent, hydrophobic surface, or hydrophilic surface treatment, oil surface, fluorine coating, silicone coating, and the like between the intermediate layer and the sheet, and a method for obtaining the sliding property is not limited thereto. By providing the sliding layer, stable quality can be obtained while ensuring a stable acoustic characteristic.

In the glass sheet composite according to the present invention, at least one of the one sheet and the other sheet is made of a glass sheet. Here, the glass sheet means an inorganic glass and an organic glass. Examples of the organic glass include a PMMA resin, a PC resin, a PS resin, a PET resin, and a cellulose resin, which are generally well known as a transparent resin.

The other sheet is made of any material, and various materials such as a resin sheet made of a resin other than the organic glass, a metal sheet made of aluminum or the like, and a ceramic sheet made of a ceramic can be adopted. From the viewpoints of design attractiveness or processability, and a weight, it is preferable to use the organic glass, a resin material, a composite material or a fiber material, a metal material, or the like, and from the viewpoint of a vibration characteristic, it is preferable to use the inorganic glass, a highly rigid composite material or fiber material, a metal material, or a ceramic material.

As the resin material, it is preferable to use a resin material that can be molded into a flat sheet shape or a curved sheet shape. As the composite material or the fiber material, it is preferable to use a resin material or a carbon fiber which is compounded with a high-hardness filler, a Kevlar fiber, or the like. As the metal material, aluminum, magnesium, copper, silver, gold, iron, titanium, SUS, and the like are preferable, and other alloy materials and the like may be used as necessary.

As the ceramic material, for example, ceramics such as $Al_2O_3$, SiC, $Si_3N_4$, AlN, mullite, zirconia, yttria, and YAG, and a single crystal material are more preferable. More preferably, the ceramic material is a material having a light-transmitting property.

When the inorganic glass is used in the glass sheet constituting at least one sheet, a composition is not particularly limited, and is preferably in the following range, for example, in terms of mass % based on oxides.

$SiO_2$: 40 mass % to 80 mass %, $Al_2O_3$: 0 mass % to 35 mass %, $B_2O_3$: 0 mass % to 15 mass %, MgO: 0 mass % to 20 mass %, CaO: 0 mass % to 20 mass %, SrO: 0 mass % to 20 mass %, BaO: 0 mass % to 20 mass %, $Li_2O$: 0 mass % to 20 mass %, $Na_2O$: 0 mass % to 25 mass %, $K_2O$: 0 mass % to 20 mass %, $TiO_2$: 0 mass % to 10 mass %, and $ZrO_2$: 0 mass % to 10 mass %. These compositions account for 95 mass % or more of the entire glass.

The composition of the inorganic glass sheet is more preferably in the following range.

$SiO_2$: 55 mass % to 75 mass %, $Al_2O_3$: 0 mass % to 25 mass %, $B_2O_3$: 0 mass % to 12 mass %, MgO: 0 mass % to 20 mass %, CaO: 0 mass % to 20 mass %, SrO: 0 mass % to 20 mass %, BaO: 0 mass % to 20 mass %, $Li_2O$: 0 mass % to 20 mass %, $Na_2O$: 0 mass % to 25 mass %, $K_2O$: 0 mass % to 15 mass %, $TiO_2$: 0 mass % to 5 mass %, and $ZrO_2$: 0 mass % to 5 mass %. These compositions account for 95 mass % or more of the entire glass.

From the viewpoint of the vibration characteristic, in the glass sheet constituting at least one sheet, the smaller the specific gravity of the glass sheet, the smaller the amount of energy necessary for vibrating the glass sheet. From the viewpoint of the vibration property alone, it is better to use the inorganic glass than the organic glass, and specifically, the specific gravity of the glass sheet is preferably 2.8 or less, more preferably 2.6 or less, and still more preferably 2.5 or less. A specific elastic modulus is a value obtained by dividing the Young's modulus of the glass sheet by density, and the higher the specific elastic modulus, the higher the rigidity of the glass sheet. Specifically, the specific elastic modulus is preferably $2.5 \times 10^7$ $m^2/s^2$ or more, more preferably $2.8 \times 10^7$ $m^2/s^2$ or more, and still more preferably $3.0 \times 10^7$ $m^2/s^2$ or more. Although there is no particular upper limit, the specific elastic modulus of the glass sheet is preferably $4.0 \times 10^7$ $m^2/s^2$ or less from the viewpoint of formability during glass production.

In order to increase the transmittance of the glass sheet composite, it is useful to make the intermediate layer to have a refractive index that matches with that of the glass sheet. That is, it is preferable that the refractive index of the glass sheet and the refractive index of the intermediate layer constituting the glass sheet composite are closer to each other since reflection and interference at a boundary therebetween are prevented. In particular, a difference between the refractive index of the intermediate layer and the refractive index of the pair of glass sheets in contact with the intermediate layer is preferably 0.3 or less, more preferably 0.2 or less, still more preferably 0.1 or less, yet still more preferably 0.05 or less, and even more preferably 0.01 or less.

It is also possible to functionalize at least one or both of the sheets constituting the glass sheet composite. This is useful in the case where design attractiveness or a function, such as IR cut, UV cut, or privacy glass, is desired to be given to the glass sheet composite. For example, a metal film or the like may be deposited on a glass surface, or a conductive resin and a coating material may be printed to form a wiring pattern or the like.

Among the sheets constituting the glass sheet composite, at least one glass sheet may be used, but two or more glass sheets may be used. In this case, glass sheets, all of which contain different compositions, may be used or glass sheets, all of which contain the same composition, may be used. Glass sheets having the same composition may be used in combination with a glass sheet having a different composition. Among others, it is preferred to use two or more kinds of glass sheets having different compositions, from the viewpoint of the design attractiveness and the acoustic characteristic.

Similarly, as to the mass and thickness, the glass sheets may be all different, may be all the same, or some may be different.

A physically strengthened glass sheet or a chemically strengthened glass sheet may be used as at least one of the glass sheets constituting the glass sheet composite. This is useful for preventing the glass sheet composite from breaking. When an increase in strength of the glass sheet composite is desired, it is preferable that the physically strengthened glass sheet or the chemically strengthened glass sheet is used as the glass sheet located in an outermost surface of the glass sheet composite, and it is more preferable that all of the constituent glass sheets are each the physically strengthened glass sheet or the strengthened glass sheet.

From the viewpoint of increasing the longitudinal wave acoustic velocity and the strength, it is also useful to use crystallized glass or phase-separated glass as the glass sheet. Especially when an increase in strength of the glass sheet composite is desired, it is preferred to use the crystallized glass or the phase-separated glass as the glass sheet located in the outermost surface of the glass sheet composite.

A coating layer may be formed or a film may be laminated on at least one outermost surface of the glass sheet composite as long as the effects of the present invention are not impaired. A known material in the related art can be used for the coating and the film, and examples of the coating include a water repellent coating, a hydrophilic coating, a water sliding coating, an oil repellent coating, a light reflection preventive coating, a heat shielding coating, and a highly reflective coating. Examples of the film include a shatter-proof film for glass, a color film, a UV cut film, an IR cut film, a heat shielding film, and an electromagnetic wave shielding film.

A shape of the glass sheet composite can be appropriately designed in accordance with applications, and may be a flat plate shape or a curved surface shape. In order to raise an output sound pressure level in a low frequency band, the glass sheet composite can be made to have a structure including an enclosure or a baffle plate. Although a material of the enclosure or the baffle plate is not particularly limited, it is preferable to use the composite of the present invention. The composite may be one having a through hole for physical fixation by a metal point, a tin point, or the like, or one having at least one hole for attaching the vibrator.

A frame may be provided to at least one outermost surface of the glass sheet composite so long as the effects of the present invention are not impaired. The frame is useful, for example, when it is desired to enhance the rigidity of the glass sheet composite, firmly hold the glass sheet composite so as to prevent a low frequency vibration, or maintain a curved surface shape. As a material of the frame, a known material in the related art may be used, and examples of the material of the frame include metal materials such as aluminum, iron, stainless steel, and magnesium; ceramics and single crystal materials such as $Al_2O_3$, SiC, $Si_3N_4$, AlN, mullite, zirconia, yttria, and YAG; fiber materials such as carbon fibers and Kevlar fibers, and other composite materials thereof; organic glass materials and transparent resin materials such as PMMA, PC, PS, PET, and cellulose; rubber materials such as butyl rubber, silicone rubber, and urethane rubber; vibration damping gel materials such as urethane gel and silicone gel; and wood materials such as lauan, teak, and plywood.

In order to prevent leakage of the intermediate layer from the frame, a seal member may be provided between the glass sheet composite and the frame.

At least a part of an outer peripheral end surface of the glass sheet composite may be sealed with a member that does not hinder the glass sheet composite from vibrating. As the seal member, a sealing tape, a resin, a highly elastic rubber, a gel, or the like can be used.

As the seal member, an acrylic seal member, a cyanoacrylate-based seal member, an epoxy-based seal member, a silicone-based seal member, a urethane-based seal member, a phenolic seal member, or the like can be used.

Examples of curing methods include two-pack mixing type, moisture curing, heat curing, ultraviolet curing, and visible light curing. A thermoplastic resin (hot-melt bond) is also usable. Examples thereof include vinyl ethylene acetate-based resins, polyolefin-based resins, polyamide-based resins, synthetic rubber-based resins, acrylic resins, and polyurethane-based resins.

As the rubber, for example, natural rubber, synthetic natural rubber, butadiene rubber, styrene-butadiene rubber, butyl rubber, nitrile rubber, ethylene-propylene rubber, chloroprene rubber, acrylic rubber, chlorosulfonated polyethylene rubber (Hypalon), urethane rubber, silicone rubber, fluororubber, ethylene-vinyl acetate rubber, epichlorohydrin rubber, polysulfide rubber (Thiokol), and hydrogenated nitrile rubber can be used.

(Method for Manufacturing Glass Sheet Composite)

The glass sheet composite according to the present invention is obtained by forming the intermediate layer between the pair of sheets.

A method for forming the intermediate layer between the pair of sheets is not particularly limited, and in the case where the glass sheet composite includes the sheets and the intermediate layer, examples thereof include a method of forming the intermediate layer on the surface of one sheet and placing the other sheet on the intermediate layer, a method of bonding the sheets each including the intermediate layer formed thereon, and a method of injecting the intermediate layer into the gap between the two sheets.

(Embodiment of Glass Sheet Composite)

FIG. 1 is a cross-sectional view of a glass sheet composite 10 according to a first embodiment of the present invention.

The glass sheet composite 10 includes a first sheet 11 and a second sheet 12, and an intermediate layer 16 disposed between the first sheet and the second sheet, and at least one of the first sheet and the second sheet is made of a glass sheet.

Figure 2:
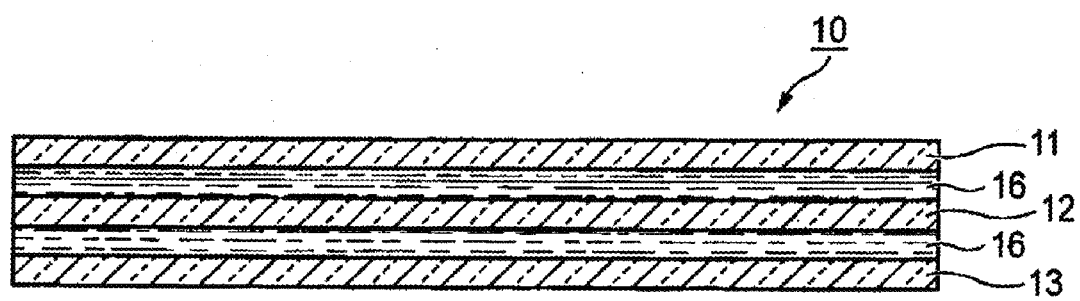
FIG. 2 is a cross-sectional view of a glass sheet composite according to another embodiment of the present invention.

FIG. 2 is a cross-sectional view showing another embodiment of the glass sheet composite 10. The glass sheet composite 10 of FIG. 2 includes another sheet 13 in addition to the configuration of the glass sheet composite 10 in FIG. 1. With such a configuration, the strength of the glass sheet composite 10 can be increased.

Figure 3:
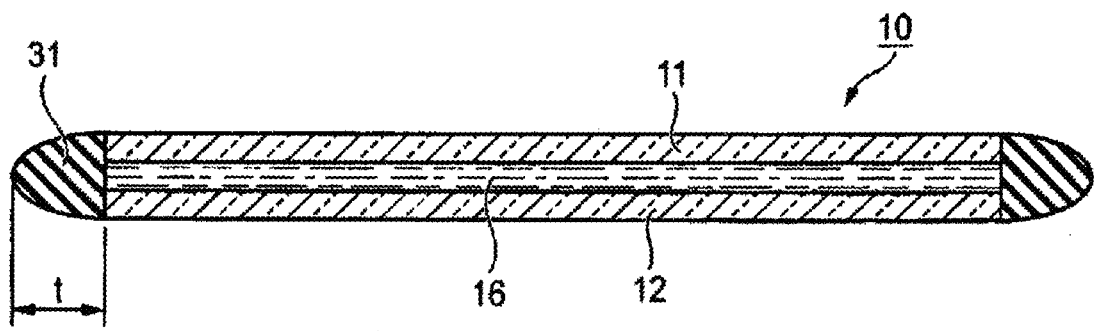
FIG. 3 is a cross-sectional view of a glass sheet composite according to another embodiment of the present invention.

FIG. 3 is a cross-sectional view showing another embodiment of the glass sheet composite 10. In addition to the configuration of the glass sheet composite 10 in FIG. 1, the glass sheet composite 10 in FIG. 3 includes an external seal member 31 on an end surface of the glass sheet composite. This can prevent physical damage to the intermediate layer 16. At this time, when the optical refractive indices of the intermediate layer and the external seal member are matched, a boundary between the intermediate layer and the external seal member is difficult to visually recognize. When the optical refractive indices of the first and second sheets 11 and 12 and the intermediate layer 16 are matched, the boundary between the first and second sheets 11 and 12 and the intermediate layer 16 is difficult to visually recognize.

Figure 4A:
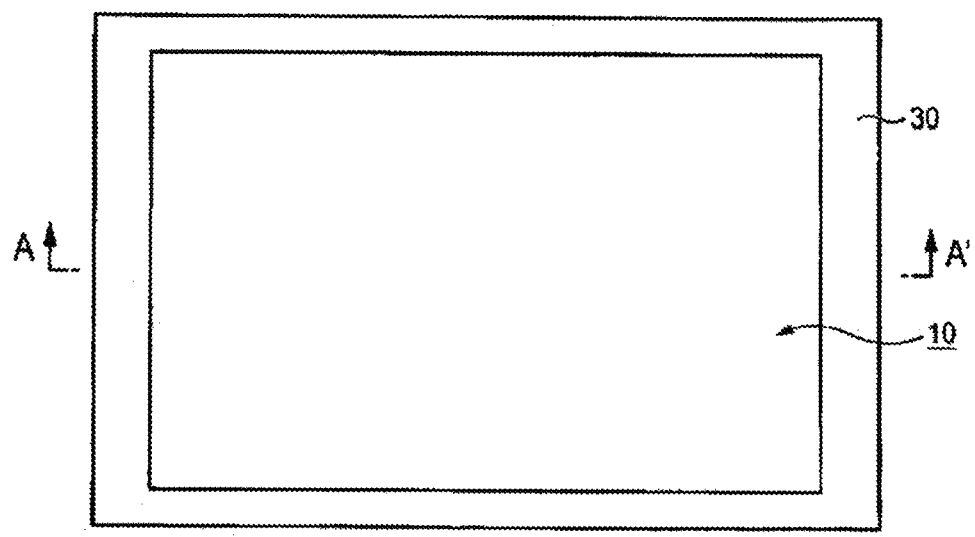
FIG. 4A and FIG. 4B show views illustrating a glass sheet composite according to another embodiment of the present invention.
Figure 4B:
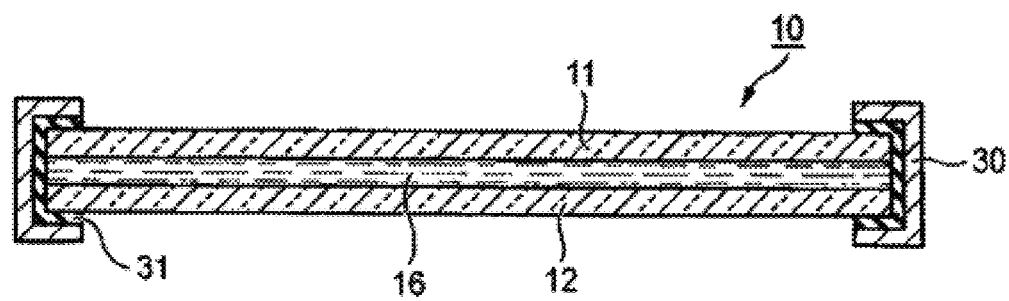

FIG. 4A and FIG. 4B show views illustrating another embodiment of the glass sheet composite 10. FIG. 4A is a plan view and FIG. 4B is a cross-sectional view. In the glass sheet composite 10 in FIG. 4A and FIG. 4B, a frame 30 is provided on an outer edge of the glass sheet composite 10, and at least on the outermost surface of the glass sheet composite 10. This is a cross-sectional view showing another embodiment of the glass sheet composite 10. A seal member 31 is provided between the glass sheet composite 10 and the frame 30.

Figure 5A:
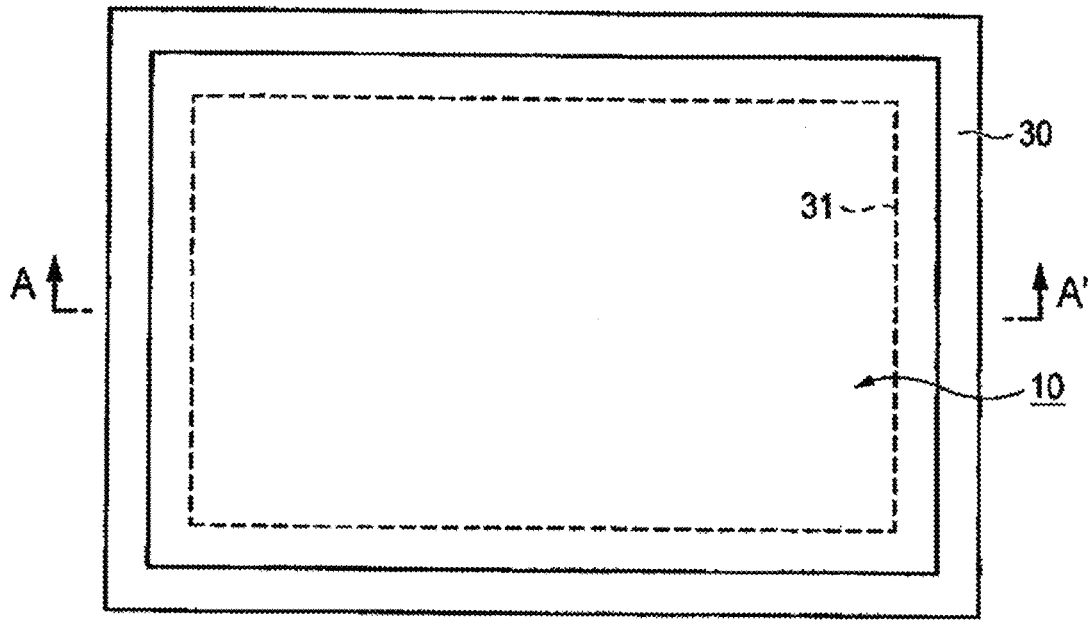
FIG. 5A and FIG. 5B show views illustrating a glass sheet composite according to another embodiment of the present invention.
Figure 5B:
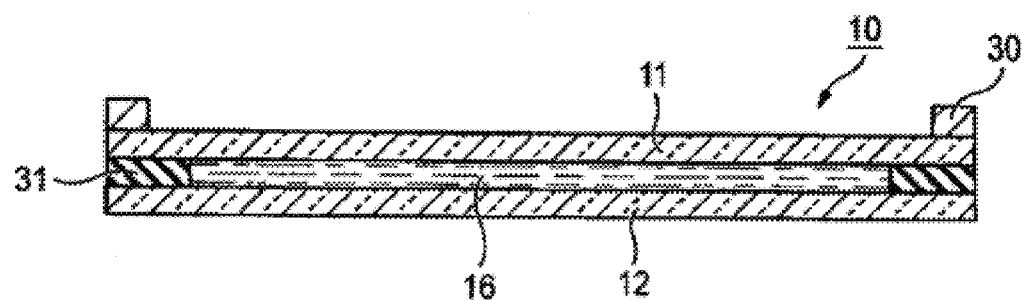

FIG. 5A and FIG. 5B show views illustrating another embodiment of the glass sheet composite 10. FIG. 5A is a plan view and FIG. 5B is a cross-sectional view. As shown in FIG. 5A and FIG. 5B, the frame 30 may be provided on the outermost surface of the first sheet 11 of the glass sheet composite 10.

Figure 6A:
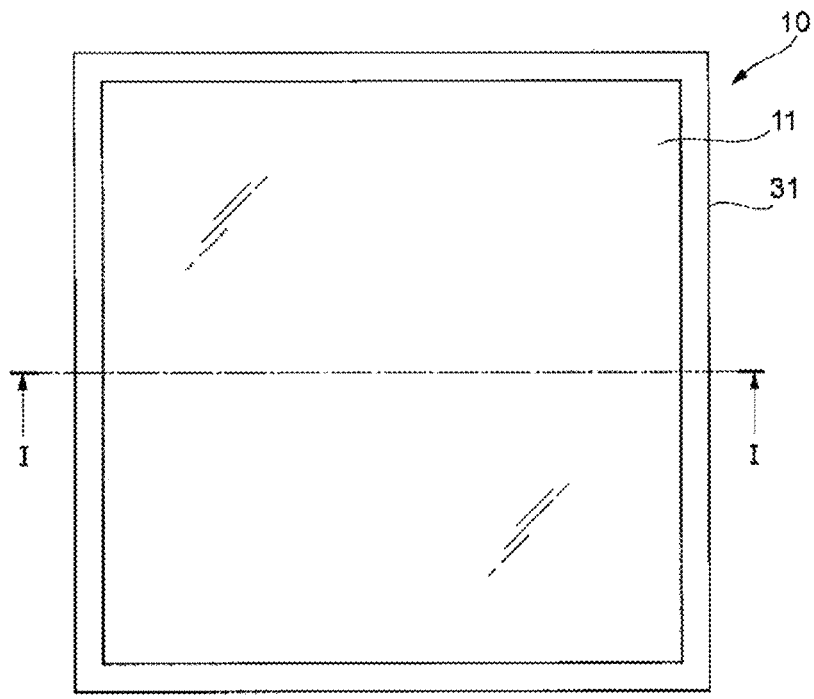
FIG. 6A to FIG. 6C show views illustrating a glass sheet composite according to another embodiment of the present invention.
Figure 6B:
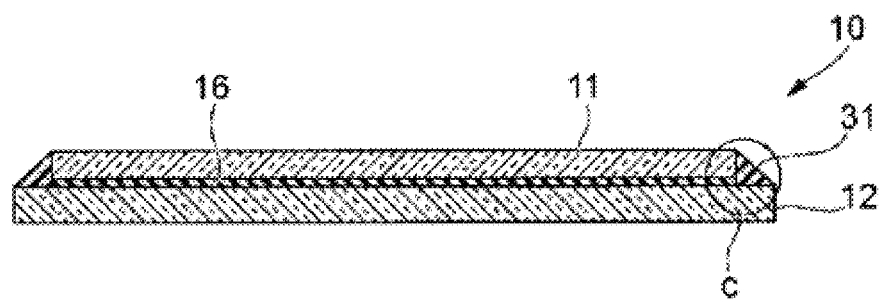
Figure 6C:
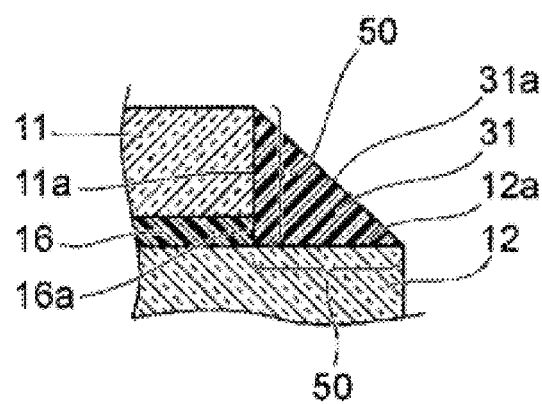

FIG. 6A to FIG. 6C show views illustrating another embodiment of the glass sheet composite 10. FIG. 6A is a plan view of the glass sheet composite, FIG. 6B is a cross-sectional view taken along a line I-I in FIG. 6A, and FIG. 6C is an enlarged view of a portion C in FIG. 6B.

As shown in FIG. 6B and FIG. 6C, end surfaces of the first sheet 11 and the second sheet 12 are displaced from each other, thereby forming a stepped portion 50 having a stepped shape in a cross-sectional view. Furthermore, in the stepped portion 50, the seal member 31 is provided so as to seal at least the intermediate layer 16.

The seal member 31 is in close contact with an end surface 11a of the first sheet 11, an end surface 16a of the intermediate layer 16, and a main surface 12a of the second sheet 12 at the stepped portion 50. With such a configuration, the intermediate layer 16 is sealed with the seal member 31, leakage of the intermediate layer 16 is prevented, and bonding of the first sheet 11, the intermediate layer 16, and the second sheet 12 is strengthened, thereby increasing the strength of the glass sheet composite 10.

In the present embodiment, the stepped portion 50 is configured such that the end surface 11a of the first sheet 11 and the end surface 16a of the intermediate layer 16 are perpendicular to the main surface 12a of the second sheet 12. As a result, the seal member 31 has a contour extending in an L shape along the stepped portion 50 in the cross-sectional view. With such a configuration, the bonding of the first sheet 11, the intermediate layer 16, and the second sheet 12 is further strengthened, and the strength of the glass sheet composite 10 is further increased.

Further, in the present embodiment, the seal member 31 includes a tapered surface 31a. An edge portion of the glass sheet composite 10 may be subjected to taper processing or the like, but by adopting such a shape of the seal member 31, it is possible to achieve the same effect as that obtained by processing the glass sheet composite.

Figure 7A:
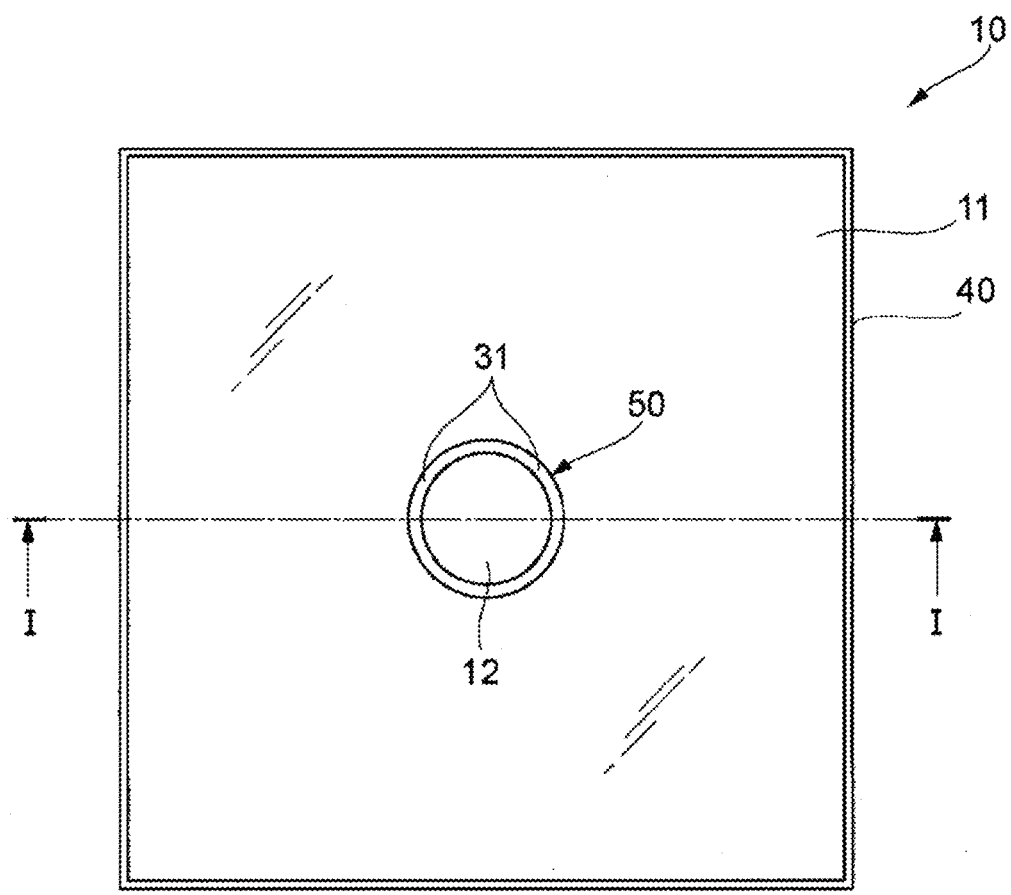
FIG. 7A and FIG. 7B show views illustrating a glass sheet composite according to another embodiment of the present invention.
Figure 7B:
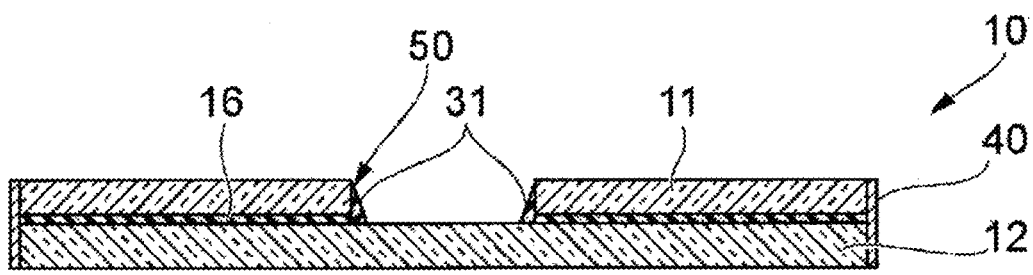

FIG. 7A and FIG. 7B show views illustrating another embodiment of the glass sheet composite 10. FIG. 7A is a plan view of the glass sheet composite, and FIG. 7B is a cross-sectional view taken along a line I-I in FIG. 7A. In the present embodiment, unlike the other embodiments, the stepped portion 50 and the seal member 31 are not provided at a peripheral edge of the glass sheet composite 10, but are provided substantially at a center of the glass sheet composite 10 in a plan view. Such a configuration also satisfies a requirement that the respective end surfaces of the two sheets (first sheet 11 and second sheet 12) are displaced from each other. Accordingly, the strength of the glass sheet composite 10 is increased. A sealing tape 40 is attached to an end surface of the peripheral edge of the glass sheet composite 10 to seal the intermediate layer 16.

<Diaphragm and Opening Member>

The present invention relates to the diaphragm including the glass sheet composite and the vibrator, and the opening member using the glass sheet composite.

The diaphragm can be made to function as a loudspeaker, a microphone, an earphone, or a casing vibrating body or casing speaker of a mobile device and the like by disposing, for example, one or more vibration elements or vibration detection elements (vibrators) on one surface or both surfaces of the glass sheet composite. In order to enhance the output sound pressure level, two or more vibration elements are preferably disposed on both surfaces of the glass sheet composite. In general, a position of the vibrator with respect to the diaphragm is preferably a central portion of the composite, and the vibrator may be disposed at an end portion of the glass sheet composite. Since size, shape, color and the like of the glass sheet composite can be freely selected, a design can be applied thereto, so that a diaphragm having excellent design can be obtained. Furthermore, by sampling sound or vibration by a sound collecting microphone or a vibration detector disposed on the surface or in the vicinity of the glass sheet composite and generating vibration of the same phase or reverse phase in the glass sheet composite, the sampled sound or vibration can be amplified or canceled. At this time, in the case where the sound or vibration characteristics at the sampling point are caused to undergo a change based on a certain acoustic transfer function in the course of propagating to the glass sheet composite diaphragm, and in the case where an acoustic conversion transfer function is present in the glass sheet composite, the vibration can be accurately amplified or canceled by correcting the amplitude and phase of the control signal by means of a control filter. At the time of constructing the control filter as described above, for example, the least-square (LMS) algorithm can be used.

In a more specific configuration, for example, the glass sheet composite of the present invention is used as all or at least one of the glass sheets of multi-layered glass, and a structure is thus produced in which the vibration level of the sheet at the inflow side of a sound wave vibration to be controlled or the sound pressure level of a space present between glasses is sampled and, after appropriate signal correction by a control filter, output to a vibration element on the glass sheet composite disposed at the outflow side of the sound wave vibration.

The glass sheet composite of the present invention can be used as, for example, an interior vibration member of transport machinery such as vehicle, or as an in-vehicle and in-machine loudspeaker. For example, as an interior member functioning as the loudspeaker, an instrument panel, a dashboard, a ceiling, a door, a sun visor, a car navigation system, an electrical light display such as an in-vehicle display, and a lighting apparatus can be used as the loudspeaker. A front glass, side glass, rear glass, a side mirror, a rearview mirror, an inner window and an outer window of a double-glazed window, a partition between a driver seat and a backseat, a partition between backseats, and the like, which are mounted in an automobile in the related art, can also be used as the loudspeaker. For the same purpose, the glass sheet composite can be mounted on a train, an airplane, a helicopter, or the like. Further, these members can also function as microphones and diaphragms for active noise control.

The above applications can be used not only for in-vehicle and in-machine applications and electronic device applications, but also for building materials. By using this diaphragm, window glass, door glass, a showcase, and the like, which require a large sheet thickness in terms of safety, can also be used as the loudspeaker.

Examples of the opening member include an opening member used in buildings and transport machinery and the like. For example, in the case of using the glass sheet composite that is less likely to resonate in a frequency band of noise generated from a driving unit of a vehicle, an aircraft, a ship, a power generator, or the like, it is possible to achieve a particularly excellent effect of preventing the generation of the noise. It is also possible to impart functions such as IR cut, UV cut, and coloring to the glass sheet composite.

When applied to the opening member, the diaphragm in which one or more vibration elements or vibration detection elements (vibrators) are disposed on one surface or both surfaces of the glass sheet composite can also be made to function as the loudspeaker or the microphone. By using the glass sheet composite according to the present invention, it is possible to easily reproduce the sound in a low frequency region and a high frequency region, which have been difficult to reproduce in the related art. Since size, shape, color and the like of the glass sheet composite can be freely selected, a design can be applied thereto, so that an opening member having excellent design can be obtained. Furthermore, by sampling the sound or the vibration by the sound collecting microphone or the vibration detector disposed on the surface or in the vicinity of the glass sheet composite and oscillating the vibration of the same phase or the reverse phase in the glass sheet composite, the sampled sound or vibration can be amplified or canceled.

More specifically, when the glass sheet composite is used as a vehicle interior loudspeaker, a vehicle exterior loudspeaker, or front glass, side glass, rear glass, or roof glass for a vehicle having a sound insulating function, a mechanism capable of transmitting or blocking only specific sound wave vibration may be employed. The glass sheet composite can also be used as a window for a vehicle, a structural member, or a decorative panel in which water repellency, snow adhesion resistance, ice adhesion resistance, and antifouling properties are improved by the sound wave vibration. Specifically, the glass sheet composite can be used as a lens, a sensor, and a cover glass thereof in addition to window glass or a mirror for an automobile.

As the opening member for buildings, window glass, door glass, roof glass, light control glass, an interior material, an exterior material, a decorative material, a structural material, an outer wall, a sound insulating plate, a sound insulating wall, and cover glass for a solar cell, which function as the diaphragm and the vibration detection device, can be used. These members may be made to function as acoustic reflection (reverberation) sheet. The water repellency, the snow adhesion resistance, and the antifouling properties can be improved by the sound wave vibration. It is also possible to function as crack detection, pest control, an animal damage countermeasure, ultrasonic communication, an echo diagnosis, or the like.

EXAMPLES

Hereinafter, the present invention will be described in detail with reference to Examples, but the present invention is not limited thereto.

<Glass Sheet Composite>

Glass sheets A and B each having a size of 10 mm×60 mm×1.1 mm were prepared, and an intermediate layer material was sandwiched therebetween so as to have a predetermined film thickness. Thus, glass sheet composites of Examples 1 to 6 were obtained.

Compositions (mass %) and physical property values of the glass sheet A and the glass sheet B are shown below.

(Glass sheet A) $SiO_2$: 61.5%, $Al_2O_3$: 20%, $B_2O_3$: 1.5%, MgO: 5.5%, CaO: 4.5%, SrO: 7%, density: 2.7 g/cm$^3$, Young's modulus: 85 GPa, specific elastic modulus: $3.2×10^7$ m$^2$/s$^2$, surface roughness: (JIS B0601) arithmetic average height Ra≤1.0 μm (Glass sheet B) $SiO_2$: 60%, $Al_2O_3$: 17%, $B_2O_3$: 8%, MgO: 3%, CaO: 4%, SrO: 8%, density: 2.5 g/cm$^3$, Young's modulus: 77 GPa, specific elastic modulus: $3.1×10^7$ m$^2$/s$^2$, surface roughness: (JIS B0601) arithmetic average height Ra≤1.0 μm Physical properties of the material used in the intermediate layer are shown in the following table. A compressive shear storage modulus, a compressive shear loss modulus, and a loss coefficient tan δ (=compressive shear storage modulus/compressive shear loss modulus) at 25° C. and 1 Hz were measured using an MCR301 (manufactured by AntonPaar). Results are shown in the following table.

TABLE 1

| Item | Compressive shear storage modulus [Pa] | Compressive shear loss modulus [Pa] | tan δ |
|---|---|---|---|
| Silicone gel | $1.2 × 10^3$ | $4.9 × 10^2$ | 0.41 |
| Pressure-sensitive adhesive | $2.7 × 10^5$ | $1.1 × 10^5$ | 0.39 |

<Measurement of Loss Coefficient>

Using a vibrator, frequency signals from 20 Hz to 6000 Hz were applied to each glass sheet composite, and the signals were swept at Δ1 Hz to measure amplitude of an edge of the glass sheet composite at each frequency. Frequencies 3 dB lower than a peak of the resonant frequency $\omega_0$ were set as $\omega_1$ and $\omega_2$, and the loss coefficient of the glass sheet composite was obtained by setting the loss coefficient=$(\omega_2-\omega_1)/\omega_0$.

Results are shown in the following table.

<Measurement of Longitudinal Wave Acoustic Velocity>

The longitudinal wave acoustic velocity can be measured by the ultrasonic pulse method described in Japanese Industrial Standards (JIS-R1602-1995). Values are shown in the following table.

Examples 1 and 2 are Working Examples, and Examples 3 to 6 are Comparative Examples

TABLE 2

|  | Example 1 | Example 2 | Example 3 | Example 4 | Example 5 | Example 6 |
|---|---|---|---|---|---|---|
| Intermediate layer material | Silicone gel | Silicone gel | Silicone gel | Pressure-sensitive adhesive | Pressure-sensitive adhesive | Pressure-sensitive adhesive |
| Film thickness of intermediate layer (μm) | 5 | 10 | 25 | 5 | 10 | 25 |
| Compressive shear storage modulus of intermediate layer material (Pa) | $1.2 \times 10^3$ | $1.2 \times 10^3$ | $1.2 \times 10^3$ | $2.7 \times 10^5$ | $2.7 \times 10^5$ | $2.7 \times 10^5$ |
| (a) Thickness of intermediate layer (mm)/total thickness of the pair of sheets (mm) | $2.3 \times 10^{-3}$ | $4.5 \times 10^{-3}$ | $1.1 \times 10^{-2}$ | $2.3 \times 10^{-3}$ | $4.5 \times 10^{-3}$ | $1.1 \times 10^{-2}$ |
| (b) Compressive shear storage modulus of intermediate layer material (Pa)/mean Young's modulus of the pair of sheets (Pa) | $1.5 \times 10^{-8}$ | $1.5 \times 10^{-8}$ | $1.5 \times 10^{-8}$ | $3.3 \times 10^{-6}$ | $3.3 \times 10^{-6}$ | $3.3 \times 10^{-6}$ |
| (a) × (b) | $3.45 \times 10^{-11}$ | $6.8 \times 10^{-11}$ | $1.7 \times 10^{-10}$ | $7.6 \times 10^{-9}$ | $1.5 \times 10^{-8}$ | $3.6 \times 10^{-8}$ |
| Glass sheet A/sheet B (mass ratio) | 1.08 | 1.08 | 1.08 | 1.08 | 1.08 | 1.08 |
| Loss coefficient of glass sheet composite | 0.439 | 0.291 | 0.264 | 0.198 | 0.227 | 0.268 |
| Longitudinal wave acoustic velocity of glass sheet composite (m/s) | 5711 | 5683 | 5601 | 5715 | 5691 | 5621 |

Since a pressure-sensitive adhesive damps the vibration using the dynamic viscoelasticity mechanism, the loss coefficient of the intermediate layer using the pressure-sensitive adhesive increased as the film thickness increased. On the other hand, the thickness of the intermediate layer needs to be increased as the sheet thickness increases.

On the other hand, in the glass sheet composite of the present invention, it is found that the loss coefficient is improved as the film thickness of the intermediate layer is reduced by using a material having a compressive shear storage modulus below a specified value for the intermediate layer.

As the film thickness of the intermediate layer becomes thinner, the acoustic velocity of the glass sheet composite becomes higher.

Therefore, in the glass sheet composite using the material having the compressive shear storage modulus below the specified value for the intermediate layer, both the loss coefficient and the acoustic velocity are high.

From the above results, it can be found that the glass sheet composite formed by the present invention can obtain a high loss coefficient and a high acoustic velocity, and has high acoustic performance.

Although the present invention has been described in detail with reference to specific embodiments, it is apparent to those skilled in the art that various changes and modifications can be made without departing from the spirit and scope of the present invention.

REFERENCE SIGNS LIST 10 glass sheet composite
11 first sheet
11a end surface of first sheet
12 second sheet
12a main surface of second sheet
13 another sheet
16 intermediate layer
30 frame
31 seal member
31a tapered surface
40 sealing tape
50 step

The invention claimed is:

1. A glass sheet composite comprising: two or more sheets; and an intermediate layer between at least a pair of the sheets, wherein
at least one of the pair of sheets is a glass sheet,
the intermediate layer satisfies all of the following properties (1) to (3), and
the glass sheet composite has a loss coefficient at 25° C. of 0.01 or more, and a sheet-thickness-direction longitudinal wave acoustic velocity of $4.0 \times 10^3$ m/s or more,
(1) the intermediate layer has a thickness of 20 μm or less,
(2) a compressive shear storage modulus at a temperature of 25° C. is $1.0 \times 10^4$ Pa or less, and
(3) at the temperature of 25° C. and 1 Hz, the compressive shear storage modulus is higher than a compressive shear loss modulus.

2. The glass sheet composite according to claim 1, wherein
all of the pair of sheets are glass sheets, and
the glass sheet composite has the loss coefficient at 25° C. of 0.01 or more, and the sheet-thickness-direction longitudinal wave acoustic velocity of $5.0 \times 10^3$ m/s or more.

3. The glass sheet composite according to claim 1, wherein
a total thickness of the pair of sheets is 1.0 mm or more, and
the intermediate layer and the sheets satisfy the following Formula A:

0<(thickness of intermediate layer [mm]/total thickness of the pair of sheets [mm])×(compressive shear storage modulus of intermediate layer material [Pa]/mean Young's modulus of the pair of sheets [Pa])≤$1.0 \times 10^{-10}$   (A).

4. The glass sheet composite according to claim 1, wherein the pair of sheets have a mean Young's modulus of 20 GPa or more at 25° C.

5. The glass sheet composite according to claim 1, wherein a product of a total thickness of the pair of sheets and a mean Young's modulus of the pair of sheets is $2.0 \times 10^7$ Pa·m or more.

6. The glass sheet composite according to claim 1, wherein a value obtained by dividing the thickness of the intermediate layer by a total thickness of the pair of sheets is 0.02 or less.

7. The glass sheet composite according to claim 1, wherein a value obtained by dividing the compressive shear storage modulus of an intermediate layer material by a mean Young's modulus of the pair of sheets is $1 \times 10^4$ or less.

8. The glass sheet composite according to claim 1, wherein a value obtained by dividing a mass of one sheet A of the pair of sheets by a mass of the other sheet B of the pair of sheets is 0.8 to 1.25.

9. The glass sheet composite according to claim 1, wherein at least one of the pair of sheets has a loss coefficient at 25° C. of $1 \times 10^{-4}$ or more.

10. The glass sheet composite according to claim 1, wherein at least one of the pair of sheets has a sheet-thickness-direction longitudinal wave acoustic velocity of $4.0 \times 10^3$ m/s or more.

11. The glass sheet composite according to claim 1, comprising a sliding layer provided on a surface of the pair of sheets that is in contact with the intermediate layer.

12. The glass sheet composite according to claim 1, wherein the glass sheet has a specific gravity of 2.8 or less.

13. The glass sheet composite according to claim 1, wherein the glass sheet has a specific elastic modulus of $2.5 \times 10^7$ m$^2$/s$^2$ or more.

14. The glass sheet composite according to claim 1, wherein a difference between a refractive index of the intermediate layer and a refractive index of the pair of sheets in contact with the intermediate layer is 0.3 or less.

15. The glass sheet composite according to claim 1, which has a curved surface shape.

16. A diaphragm comprising: the glass sheet composite according to claim 1; and at least one vibrator disposed on one surface or both surfaces of the glass sheet composite.

17. An opening member using the glass sheet composite according to claim 1.

18. An opening member using the diaphragm according to claim 16.

* * * * *